US012670422B1

(12) United States Patent
Tasitsiomi

(10) Patent No.: US 12,670,422 B1
(45) Date of Patent: Jun. 30, 2026

(54) SYSTEMS AND METHODS FOR BUILDING A PREDICTION MODEL WITH VARYING LEVELS OF DATA AVAILABILITY

(71) Applicant: BlackRock Finance, Inc., New York, NY (US)

(72) Inventor: Argyro Tasitsiomi, New York, NY (US)

(73) Assignee: BlackRock Finance, Inc., New York, NY (US)

( * ) Notice: Subject to any disclaimer, the term of this patent is extended or adjusted under 35 U.S.C. 154(b) by 1080 days.

(21) Appl. No.: 17/719,774

(22) Filed: Apr. 13, 2022

Related U.S. Application Data

(60) Provisional application No. 63/256,297, filed on Oct. 15, 2021.

(51) Int. Cl.
| | |
|---|---|
| *G06N 7/01* | (2023.01) |
| *G06F 16/2457* | (2019.01) |
| *G06F 16/2458* | (2019.01) |
| *G06F 18/21* | (2023.01) |
| *G06F 18/214* | (2023.01) |

(52) U.S. Cl.
CPC ........... *G06N 7/01* (2023.01); *G06F 16/2457* (2019.01); *G06F 16/2462* (2019.01); *G06F 18/214* (2023.01); *G06F 18/2193* (2023.01)

(58) Field of Classification Search
CPC ... G06N 7/01; G06F 16/2457; G06F 16/2462; G06F 18/214; G06F 18/2193
See application file for complete search history.

(56) References Cited

U.S. PATENT DOCUMENTS

| | | | | |
|---|---|---|---|---|
| 6,876,955 | B1 | 4/2005 | Fleming | |
| 11,216,831 | B1 | 1/2022 | Holligan et al. | |
| 11,783,385 | B1 | 10/2023 | Khosravan et al. | |
| 2002/0116236 | A1 | 8/2002 | Johnson et al. | |
| 2013/0226842 | A1* | 8/2013 | Chu | G06N 5/025 |
| | | | | 706/12 |
| 2016/0358070 | A1 | 12/2016 | Brothers | |
| 2017/0254660 | A1* | 9/2017 | Panahandeh | G01C 21/3837 |
| 2020/0320400 | A1* | 10/2020 | David | G06N 3/045 |
| 2020/0372384 | A1* | 11/2020 | Sun | G06F 17/18 |
| 2020/0394455 | A1* | 12/2020 | Lee | G06N 20/00 |
| 2021/0241137 | A1* | 8/2021 | Jain | G16H 10/20 |
| 2021/0279824 | A1 | 9/2021 | Hyunyoung et al. | |
| 2022/0084079 | A1 | 3/2022 | Stewart et al. | |

(Continued)

OTHER PUBLICATIONS

Ma, Zhihua, and Guanghui Chen. "Bayesian methods for dealing with missing data problems." Journal of the Korean Statistical Society 47 (2018): pp. 297-313. (Year: 2018).*

(Continued)

*Primary Examiner* — Omar F Fernandez Rivas
*Assistant Examiner* — Michael C. Lee
(74) *Attorney, Agent, or Firm* — Haynes and Boone, LLP

(57) ABSTRACT

Systems, methods, and computer program products described herein for building a prediction model with varying availability. Embodiments described herein build a prediction model that is initially trained with a selected subset of data characteristics (e.g., data characteristics that are commonly available in training data), and then augmented via Bayesian estimation with additional data characteristics when such data characteristics are available.

19 Claims, 7 Drawing Sheets

(56) References Cited

U.S. PATENT DOCUMENTS

| | | | |
|---|---|---|---|
| 2022/0383156 A1* | 12/2022 | Harsola | ................... G06N 5/04 |
| 2023/0040185 A1* | 2/2023 | Taneja | .................. G16H 50/30 |

OTHER PUBLICATIONS

Snoek, Jasper, et al. "Scalable bayesian optimization using deep neural networks." International conference on machine learning. PMLR, 2015 (Year: 2015).*

Bauer, Matthias, et al. "Discriminative k-shot learning using probabilistic models." arXiv preprint arXiv:1706.00326 (2017). (Year: 2017).*

Weber, Noah, et al. "Optimizing over a bayesian last layer." NeurIPS workshop on Bayesian Deep Learning. 2018 (Year: 2018).*

Harrison, James, et al. "Meta-learning priors for efficient online bayesian regression." International Workshop on the Algorithmic Foundations of Robotics. Cham: Springer International Publishing, 2018 (Year: 2018).*

Tran, Dustin, et al. "Bayesian layers: A module for neural network uncertainty." Advances in neural information processing systems 32 (2019). (Year: 2019).*

Watson, Joe, et al. "Latent derivative Bayesian last layer networks." International Conference on Artificial Intelligence and Statistics. PMLR, (Jan. 1, 2021). (Year: 2021).*

Keleher, "Time is of the essence clause in real estate explained", Jul. 6, 2021, retrieved from the internet: https://www.rate.com/resources/time-is-of-the-essence, 5 pages.

* cited by examiner

SYSTEMS AND METHODS FOR BUILDING A PREDICTION MODEL WITH VARYING LEVELS OF DATA AVAILABILITY

CROSS-REFERENCE(S)

The application is a nonprovisional of and claims priority to 35 U.S.C. 119 to U.S. provisional application No. 63/256,297, filed Oct. 15, 2021.

This application is related to U.S. nonprovisional application Ser. No. 17/719,758.

Both of the aforementioned applications are hereby expressly incorporated by reference herein in their entirety.

TECHNICAL FIELD

The disclosure generally relates to statistical and machine learning systems, and more specifically to building a prediction model with varying levels of data availability.

BACKGROUND

Machine learning models have been widely used in control systems for predicting system behaviors. For example, an autonomous driving vehicle may engage a prediction model to predict a road condition (e.g., whether a moving object nearby is a vulnerable target such as a pedestrian, etc.), a traffic situation (e.g., what is the predicted traffic depending on the time of the day), and/or the like in order to generate a navigational strategy. Historical data can often be used as training data to build such prediction models. However, as data availability may vary over time, e.g., some data characteristics may not be available at the time of training the prediction model, it remains challenging to build a prediction model that makes effective use of available training data. For example, when training a prediction model for road condition prediction, data characteristics relating to the type of the road surface (e.g., concrete, asphalt, pebble, sand, soil, etc.) may not be available. But such data characteristics may be crucial in determining a navigational strategy.

Therefore, there is a need for building a prediction model that adapts to varying levels of data availability.

Figure 1:
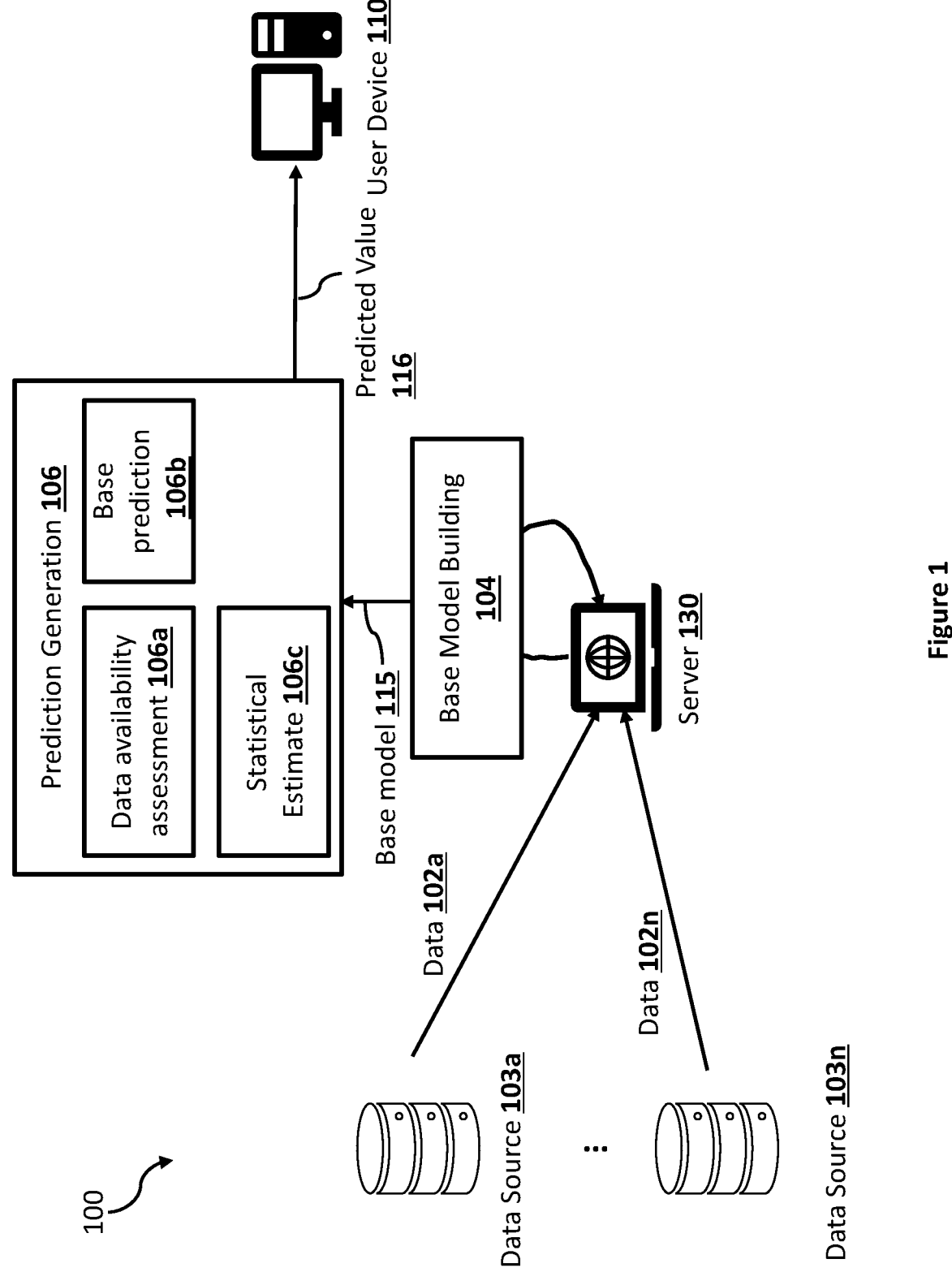
FIG. 1 provides a block diagram illustrating example data flows among a framework of various entities for implementing a prediction model with varying levels of data availability, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "substantially" refers to a characteristic that achieve a certain property for the most part. For example, a set of variables that maximizes a numerical approximation of an objective function may be referred to as substantially maximizes the original objective function.

Control systems can often be analyzed by prediction models. To build a prediction model, training data samples are obtained, e.g., from historical measurements and/or observations of the control system, each of which includes an input sample and a corresponding output sample. The input sample may include a plurality of input characteristics. For example, for a prediction model that predicts a road condition in an autonomous driving system, input data characteristics may include the GPS coordinates, zip code, weather, time and date, and/or the like. However, as data availability may vary, for example, weather data may not be available for some data samples, it remains challenging to build a prediction model depending on the varying levels of data availability.

For example, theoretically, the input sample may include N data characteristics, but at the time of training, only $M < N$ data characteristics are available. If a prediction model is trained using training samples having the M characteristics, it is possible that as more training data is made available, $M+1$ data characteristics are available at the time of model testing, valuation or inference stage. Thus, the trained prediction model based on the M characteristics may not make the most effective use of available training data. An easy solution is to re-train the prediction model using input samples having all $M+1$ data characteristics. However, the re-training would incur a large amount of computational overhead if a model is to be re-built for every possibility of data availability, e.g., when N=10, a total of 1023 models may be trained to fit different scenarios of data availability.

In view of the issues with building a prediction model with varying availability, embodiments described herein build a prediction model that is initially trained with a selected subset of data characteristics (e.g., data characteristics that are commonly available in training data), and then augmented via Bayesian estimation with additional data characteristics when such data characteristics are available.

For instance, in the example of road condition prediction in autonomous driving, a base prediction model may be built, e.g., only using training data of GPS coordinates and a corresponding ground-truth road condition. The base prediction model may generate a predicted road condition based on an input of GPS coordinates. The predicted road condition is then compared with the corresponding ground-truth road condition to compute a training objective, e.g., the cross-entropy between the predicted road condition and the ground-truth. The base prediction model is then updated based on the training objective via backpropagation. After the training, at testing or inference stage, the base prediction model may receive an input containing a testing GPS coordinate and additional testing characteristics such as the weather and the time and date to refine the prediction. With more data availability, instead of re-training the base prediction model with the newly available characteristics, a road prediction may be generated by first generating a base prediction using the base prediction model based on an input of the testing GPS coordinate only, and then refine the base prediction with Bayesian estimates of the newly available characteristics conditioned on the base prediction.

In one embodiment, the augmentation with additional data characteristics may not be conducted via an online manner. Specifically, types of additional available characteristics may be anticipated, e.g., the training data may be originally provided in a spreadsheet of a number of data characteristics (e.g., GPS coordinates, zip code, weather, time and date, etc.) but some entries in the column of "weather" may be empty. In this case, the base prediction model may be built without the weather data. Bayesian distribution of the weather characteristics conditioned on the base prediction may be obtained based on statistical analysis of historical data. Thus, when the missing entries of "weather" data is available, a new prediction may be obtained based on the base prediction and previously computed statistical conditional distribution of weather data.

For example, assuming $\hat{y}$ is the base prediction for the road condition from base prediction model, $\hat{y}$ is generated without knowing the characteristics $f_1$, $f_3$. When the characteristics $f_1$, $f_3$ are available, the prediction $\hat{y}$ may be updated given this additional information:

$$P(\hat{y}'') = P(\hat{y}) \times P(f_1, f_3 \mid \hat{y}) / P(f_1, f_3)$$

where $P(\hat{y})$ is the prior probability density of the predicted value y generated by the base prediction model; $P(f_1, f_3 \mid \hat{y})$ is the conditional probability of the newly available data characteristics given the base model prediction; and $P(f_1, f_3)$ is the marginal probability of the newly available characteristics. In this way, instead of re-training the prediction model based training data augmented with $f_1$, $f_3$, a prediction of $P(\hat{y}'')$ may be computed using the Bayesian estimate of the conditional probability of $P(f_1, f_3 \mid \hat{y})$. Specifically, when the data characteristics $f_1$, $f_3$ are independent, i.e., $P(f_1, f_3 \mid \hat{y})$ $= P(f_1, f_3 \mid \hat{y}) \times P(f_3 \mid \hat{y})$, a maximum of N conditional probabilities $P(f_i \mid \hat{y})$ need to be estimated through Bayesian estimation to compute an updated prediction based on newly available data characteristics. The Bayesian estimate of the conditional distribution $P(f_1, f_3 \mid \hat{y})$ may be obtained, e.g., via statistical analysis based on historical data of $f_1$, $f_3$ when $\hat{y}$ is generated. Thus, when new training data characteristics $f_1, f_3$ is made available, $P(\hat{y}'')$ may be computed using existing metrics.

In this way, a combination of a base prediction model training and Bayesian estimation may serve as a prediction model of multiple flexible "layers" that can adapt to different levels of data availability without re-training the prediction model. Each layer represents the availability of one or more data characteristics in addition to those that were used in building the base prediction model. Computational efficiency of building the prediction model can thus be largely improved.

FIG. 1 provides a block diagram illustrating example data flows among a framework of various entities for implementing a prediction model with varying levels of data availability, according to embodiments described herein.

Diagram 100 shows a server 130, various data sources 103a-n, a user device 110, and/or the like interact with each other, e.g., via a communication network. In diagram 100, the number of data sources 103a-n, are shown for illustrative purposes, while any number of databases may be communicative with the server 130.

In one embodiment, the server 130 may receive data 102a-n relating to a commercial real estate property asset from data sources 103a-n via a communication network. The data 102a-n may include factual information comprising various data characteristics or features that affect the system behavior of a control system. For example, data characteristics relating to an autonomous driving system may include weather data, location data, map data, traffic data, accident report data, and/or the like.

Example data sources 103a-n that provide data 102a-n may include a local database, a remote database, a cloud sourced database, and/or the like that store historical data relating to autonomous driving. It is worth noting that the prediction model building described herein may be applicable to other kind of data characteristics and/or other control systems.

In one embodiment, the server 130 may receive inputs of data 102a-n for a base model building module 104. Data 102a-n may be received in the form of a spreadsheet with each row representing a training data sample comprising input data characteristics and a corresponding ground-truth output value, and each column representing a data feature or characteristic such as GPS coordinate, weather, time and date, traffic report, and/or the like.

In some scenarios, due to data availability, the spreadsheet of data 102a-n received from a data source may often have data entries missing in one or more columns of data features. For example, weather information may be missing at certain locations. Thus, the base model building module 104 may then determine and evaluate which data characteristics (columns) from the spreadsheet of data 102a-n are to be used to built and train the base prediction model 115.

In one embodiment, the base model building module 104 may preprocess and convert the received data 102a-n into input vectors for training the base prediction model 115. For example, the base model building module 104 may select a most commonly available subset of data characteristics from data 102a-n for base model training. For another example, the base model building module 104 may adjust its selection of the subset of data characteristics for base model 115 by gradually revising and updating the base prediction model 115 with varying data characteristics depending on whether the prediction from the resulting base model 115 is satisfactory. In one implementation, the prediction from the resulting base model 115 is compared with a ground-truth value annotated in data 102*a-n*. In another implementation, when such ground-truth is unavailable, the prediction is compared with previously generated prediction based on lesser input data. In this way, a "minimal" set of data characteristics that yield satisfactory approximated prediction may be determined for building a base prediction model 115.

In one embodiment, parameters of the base model 115 may be passed to the prediction generation module 106. The prediction generation module 106 may perform data availability assessment 106*a*, base prediction 106*b* and statistical estimate 106*c* to generate a predicted value 116 in response to a testing input. For example, the data availability assessment 106*a* may determine whether a testing input have more data characteristics than those used in building the base prediction model 115, e.g., the base prediction model 115 may be built using GPS coordinate data to predict a road condition, but the testing input may include GPS coordinate data and additional weather data. The base prediction 106*b* may generate a base prediction using the base prediction model 115, e.g., the GPS coordinate data contained in the testing input may be used to generate a base road condition prediction by the base model 115. The statistical estimate module 106*c* may then generate a conditional Bayesian estimate probability of the additional data characteristics in the testing input conditioned on the base prediction. Results from the base prediction 106*b* and the statistical estimation 106*c* may then be combined to generate the predicted value 116.

The predicted value 116 may then be sent to a user device 110, e.g., operated by a driver, a system admin, and/or the like. In one embodiment, the predicted value 116, such as a predicted road condition, may be output to an autonomous driving system for assisting the auto-navigation.

Figure 2:
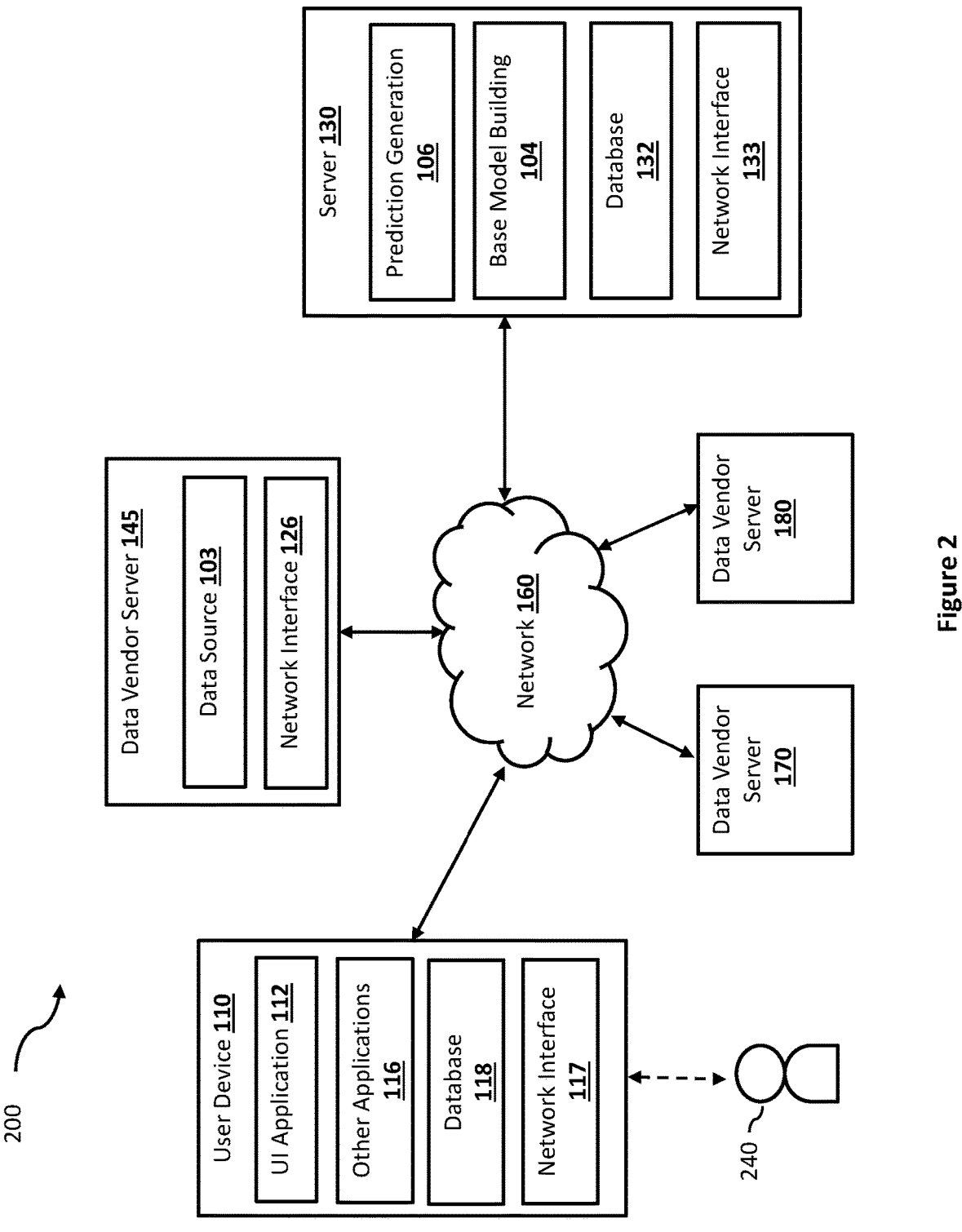
FIG. 2 is a block diagram of a networked system suitable for implementing the framework described in FIG. 1 and other embodiments described herein, according to an embodiment.

FIG. 2 is a block diagram of a networked system suitable for implementing the framework described in FIG. 1 and other embodiments described herein, according to an embodiment. In one embodiment, block diagram 200 shows a system including the user device 110 which may be operated by user 240, data vendor servers 145, 170 and 180, server 130, and other forms of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 110, data vendor servers 145, 170 and 180, and the server 130 may communicate with each other over a network 160. User device 110 may be utilized by a user 240 (e.g., a driver, a system admin, etc.) to access the various features available for user device 110, which may include processes and/or applications associated with the server 130 to receive an output data anomaly report.

User device 110, data vendor server 145, and the server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 160.

User device 110 may be implemented as a communication device that may utilize appropriate hardware and software configured for wired and/or wireless communication with data vendor server 145 and/or the server 130. For example, in one embodiment, user device 110 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 2 contains a user interface (UI) application 112, and/or other applications 116, which may correspond to executable processes, procedures, and/or applications with associated hardware. For example, the user device 110 may receive a message indicating a predicted value for a control system (e.g., 116 in FIG. 1) from the server 130 and display the message via the UI application 112. In other embodiments, user device 110 may include additional or different modules having specialized hardware and/or software as required.

In various embodiments, user device 110 includes other applications 116 as may be desired in particular embodiments to provide features to user device 110. For example, other applications 116 may include security applications for implementing client-side security features, programmatic client applications for interfacing with appropriate application programming interfaces (APIs) over network 160, or other types of applications. Other applications 116 may also include communication applications, such as email, texting, voice, social networking, and IM applications that allow a user to send and receive emails, calls, texts, and other notifications through network 160. For example, the other application 116 may be an email or instant messaging application that receives a prediction result message from the server 130. Other applications 116 may include device interfaces and other display modules that may receive input and/or output information. For example, other applications 116 may contain software programs for asset management, executable by a processor, including a graphical user interface (GUI) configured to provide an interface to the user 240 to view a report of prediction result 116.

User device 110 may further include database 118 stored in a transitory and/or non-transitory memory of user device 110, which may store various applications and data and be utilized during execution of various modules of user device 110. Database 118 may store user profile relating to the user 240, predictions previously viewed or saved by the user 240, historical data received from the server 130, and/or the like. In some embodiments, database 118 may be local to user device 110. However, in other embodiments, database 118 may be external to user device 110 and accessible by user device 110, including cloud storage systems and/or databases that are accessible over network 160.

User device 110 includes at least one network interface component 117 adapted to communicate with data vendor server 145 and/or the server 130. In various embodiments, network interface component 117 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 145 may correspond to a server that hosts one or more of the databases 103*a-n* (or collectively referred to as 103) to provide data 102*a-n* to the server 130. The database 103 may be implemented by one or more relational database, distributed databases, cloud databases, and/or the like.

The data vendor server 145 includes at least one network interface component 126 adapted to communicate with user device 110 and/or the server 130. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 145 may send asset information from the database 103, via the network interface 126, to the server 130.

The server 130 may be housed with the prediction generation module 106 and the base model building module 104. In some implementations, modules 104 and 106 may receive data from database 103 at the data vendor server 145 via the network 160 and build or implement a prediction model such as a regression model and/or a machine learning model to generate a predicted value (e.g., 116 in FIG. 1) in response to input control parameters comprising a set of data characteristics. The generated value 116 may also be sent to the user device 110 for review by the user 240 via the network 160.

The database 132 may be stored in a transitory and/or non-transitory memory of the server 130. In one implementation, the database 132 may store data obtained from the data vendor server 145. In one implementation, the database 132 may store parameters of the base prediction model 115. In one implementation, the database 132 may store previously predicted values generated from the prediction generation module 106, and the corresponding input feature vectors.

In some embodiments, database 132 may be local to the server 130. However, in other embodiments, database 132 may be external to the server 130 and accessible by the server 130, including cloud storage systems and/or databases that are accessible over network 160.

The server 130 includes at least one network interface component 133 adapted to communicate with user device 110 and/or data vendor servers 145, 170 or 180 over network 160. In various embodiments, network interface component 133 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 200.

Figure 3:
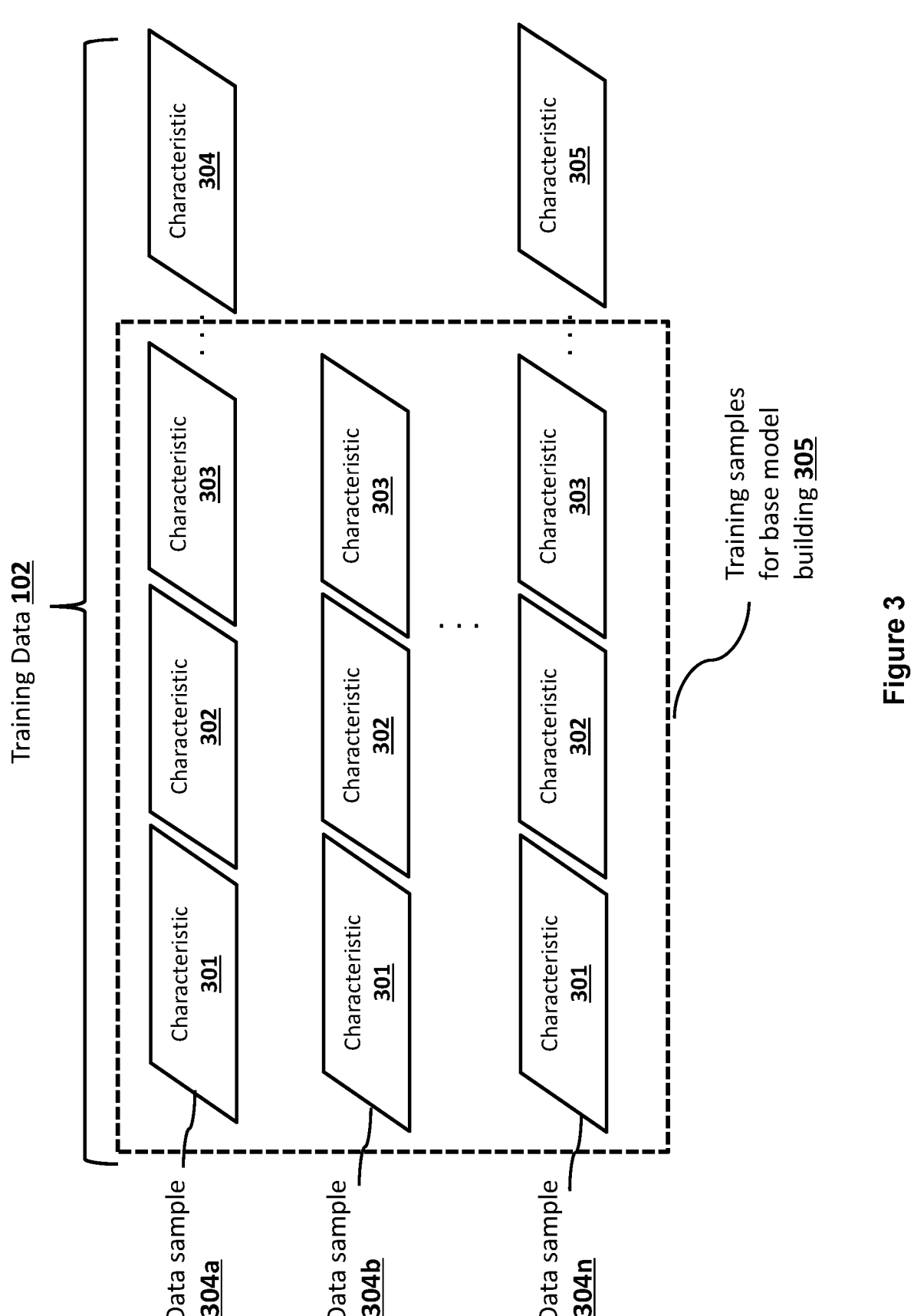
FIG. 3 is a simplified diagram illustrating an example data structure of training data samples for building the base prediction model, according to embodiments described herein.

FIG. 3 is a simplified diagram illustrating an example data structure of training data samples for building the base prediction model, according to embodiments described herein. At training stage, the base prediction model 115 may be built and trained with the training data 102. As shown in FIG. 3, the training data may comprise a plurality of data samples 304*a-n*. Each of the data sample may comprise a plurality of data characteristics 301, 302, 303, 304, 305 and/or the like. However, due to varying levels of data availability from different data sources, data samples 304*a-n* received from multiple data sources may not always comprise the same set of data characteristics. For example, data samples 304*a* does not comprise data characteristic 305, while data sample 304*b* does not comprise data characteristics 304 or 305.

In one embodiment, to utilize the training data 102 with varying availability of data characteristics, the base model building module 104 may select a subset of data characteristics 305 and convert the subset of data characteristics as training input vectors. For example, the most commonly available data characteristics may be selected as the training data 305 for base model training, e.g., data characteristics 301-303 shown in FIG. 3.

For another example, the base model building module 104 may optionally build multiple prediction models based on different training datasets corresponding to different sets of data characteristics, e.g., one prediction model based on characteristics 301, another prediction model based on characteristics 301-302, and/or the like. Testing outputs may be generated from the multiple prediction models in response to a same testing input query and compared. Relevant data characteristics may then be identified for building the base prediction model depending on whether the testing outputs are within an accuracy range. For instance, if prediction results generated from prediction model based on characteristics 301 and the prediction model based on characteristics 301-302 are sufficiently close, e.g., within an accuracy range, either of the prediction models may be adopted as the base prediction model.

For another example, the base model building module 104 may start with one or two most commonly available data characteristics (e.g., characteristics 301 or 302) for training a base prediction model 115. The base model building module 104 may then optionally adjust its selection of the subset of data characteristics 301-302 for base model 115 by gradually revising and updating the base prediction model 115 with varying data characteristics depending on whether the prediction from the resulting base model 115 is satisfactory. For instance, the base model building module 104 may first build a base prediction model 115 only using data characteristic 301 as training inputs, the resulting base prediction model may be evaluated, e.g., by comparing its prediction with a ground-truth value, or previously generated prediction. If the prediction accuracy of the resulting base prediction model is unsatisfactory, e.g., outside a tolerance range, more data characteristics may be incorporated, e.g., adding characteristic 303, to the training samples to re-train the base prediction model at 305. In this way, a subset of data characteristics that yield satisfactory approximated prediction may be determined for building a base prediction model 115. The base prediction model 115 may thus be trained using training samples having the subset of data characteristics 305.

Figure 4:
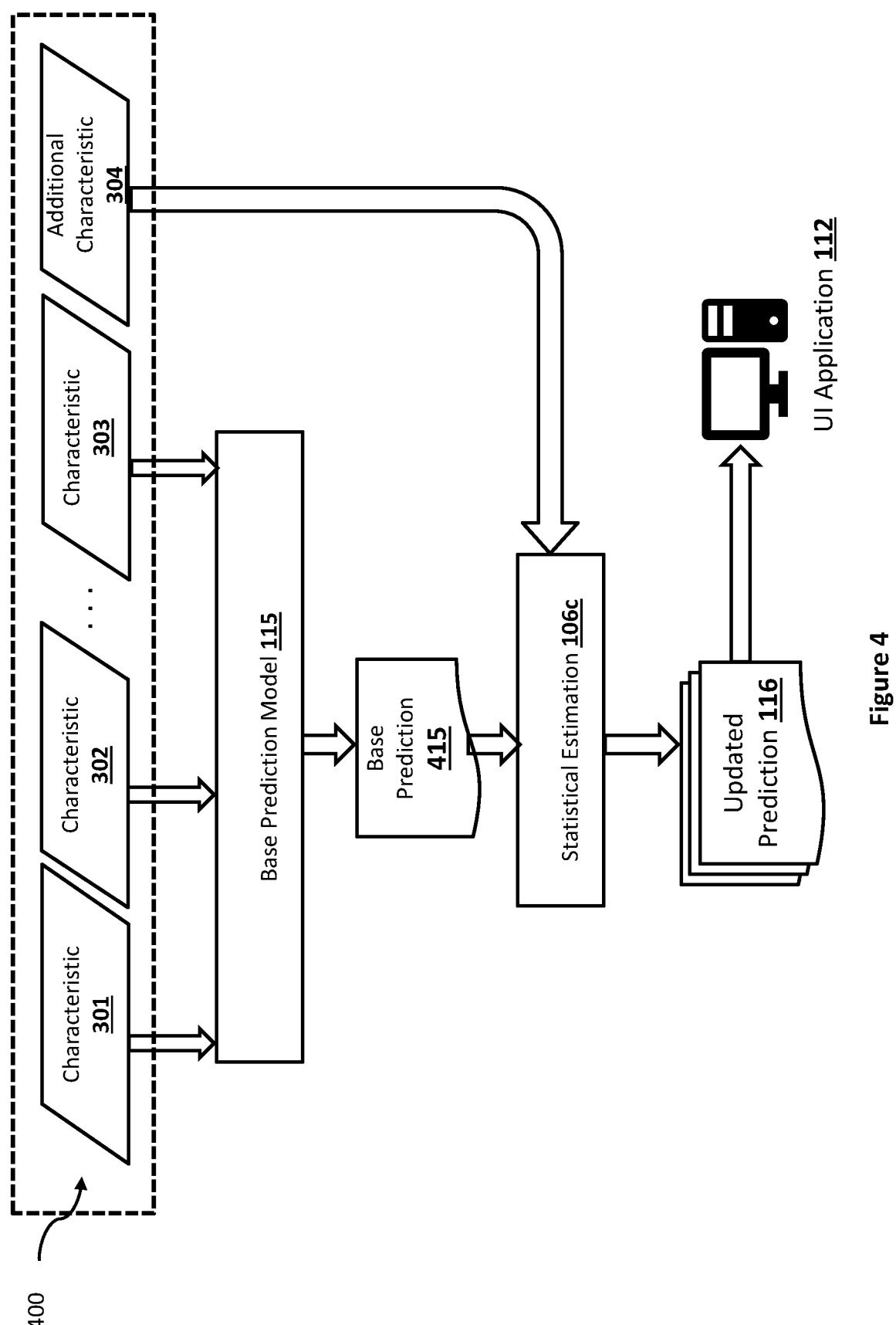
FIG. 4 provides a simplified diagram illustrating an example operation of the prediction model with Bayesian estimation, according to embodiments described herein.

FIG. 4 provides a simplified diagram illustrating an example operation of the prediction model with Bayesian estimation, according to embodiments described herein. After the base prediction model 115 has been trained with a subset of data characteristics (e.g., data characteristics 301-303) shown in FIG. 3, the base prediction model 115 may be tested, evaluated or utilized to generate a prediction in response to an input query. In one embodiment, at the time of testing, model valuation or inference stage, more training data of additional characteristics may be available. For example, more training data having the characteristic 304 may be available after training the base prediction model 115.

Instead of re-training the base prediction model 115 with training data 400 with available data characteristics 301-304, the base prediction model 115 may engage Bayesian estimation for refine predictions using the newly available data. For example, for a testing input comprising characteristics 301-304, the base prediction model 115 may generate a base prediction 415 in response to an input vector of data characteristics 301-303, because the base prediction model 115 was trained only based on data characteristics 301-303.

The additional characteristic 304 is then input to the statistical estimation module 106c, which in turn generates the updated prediction 116 based on the additional characteristic 304 and the base prediction 415. For example, assuming a set of data characteristics $F=\{f_1, f_2, f_3, \ldots f_N\}$ are associated with the training data 102 in FIG. 3, but only a subset of characteristics $\{f_1, f_2, f_3, \ldots f_M\}$ (M<N) are used to build the base prediction model 115. Let $\hat{y}$ denote the base prediction 415 from base prediction model 115, then $\hat{y}$ is generated without knowing the additional characteristics $\{f_{M+1}, \ldots, f_N\}$. When the additional characteristics $\{f_{M+1}, \ldots, f_N\}$ are available, the base prediction $\hat{y}$ 415 may be updated given this additional information:

$$P(\hat{y}^u) = P(\hat{y}) \times P(f_{M+1}, \ldots, f_N \mid \hat{y}) / P(f_{M+1}, \ldots, f_N)$$

where $P(\hat{y})$ is the prior probability of the predicted value $\hat{y}$ generated by the base prediction model 115; $P(f_{M+1}, \ldots, f_N \mid \hat{y})$ is the conditional probability of the newly available data characteristics 304 given the base model prediction; and $P(f_{M+1}, \ldots, f_N)$ is the marginal probability of the newly available characteristics 304.

In one embodiment, the Bayesian framework may be invoked to handle the additional available characteristics $f_{M+1}, \ldots, f_N$ which are independent, $$P(\hat{y}) \times P(f_{M+1}, \ldots, f_N \mid \hat{y}) = P(\hat{y}) \prod_i P(f_i \mid \hat{y}), i = M+1, \ldots, N$$

Thus, the updated prediction 116 can be approximated by:

$$P(\hat{y}^u \mid f) \sim P(\hat{y}) \prod_i P(f_i \mid \hat{y}).$$

In one embodiment, kernel density estimation (KDE) may be adopted to estimate the approximated conditional probability density function $P(f_i \mid \hat{y})$. For example, existing Python package for statistical modeling such as PyMC3 or PyStan24 may be used to perform the Bayesian inference when additional data characteristics $f_{M+1}, \ldots, f_N$ are available.

In one embodiment, even if not all additional available characteristics $f_M, f_{M+1}, \ldots, f_N$ are mutually independent, e.g., $f_M, f_{M+1}$ are related, the updated prediction 116 can still be approximated based on a product of Bayesian estimates of conditional probabilities of independent data characteristics, and a Bayesian estimate of a joint conditional probability of the first data characteristic $f_M$ and the second data characteristic $f_{M+1}$ conditioned on the base prediction value $\hat{y}$:

$$P(\hat{y}^u \mid f) \sim P(\hat{y}) P(f_M, f_{M+1} \mid \hat{y}) \prod_{i=M+2}^{N} P(f_i \mid \hat{y}).$$

In one embodiment, if the additional available characteristics $f_M, f_{M+1}, \ldots, f_N$ are not mutually independent, the system may employ principal component analysis (PCA) to express the proportion of total variability in the dependent variables that is explained by a combination of independent variables. In this way, the additional available characteristics may still be expressed by the independent variables such that the Bayesian framework described above can be applied.

In this way, the approximation of prediction result 116 based on newly available data characteristics may be computed without re-training or re-building another prediction model, but with relatively reduced computational overhead through Bayesian estimation.

The generated updated prediction 116 may then be provided to a UI application 112 running on a user device 110.

Figure 5:
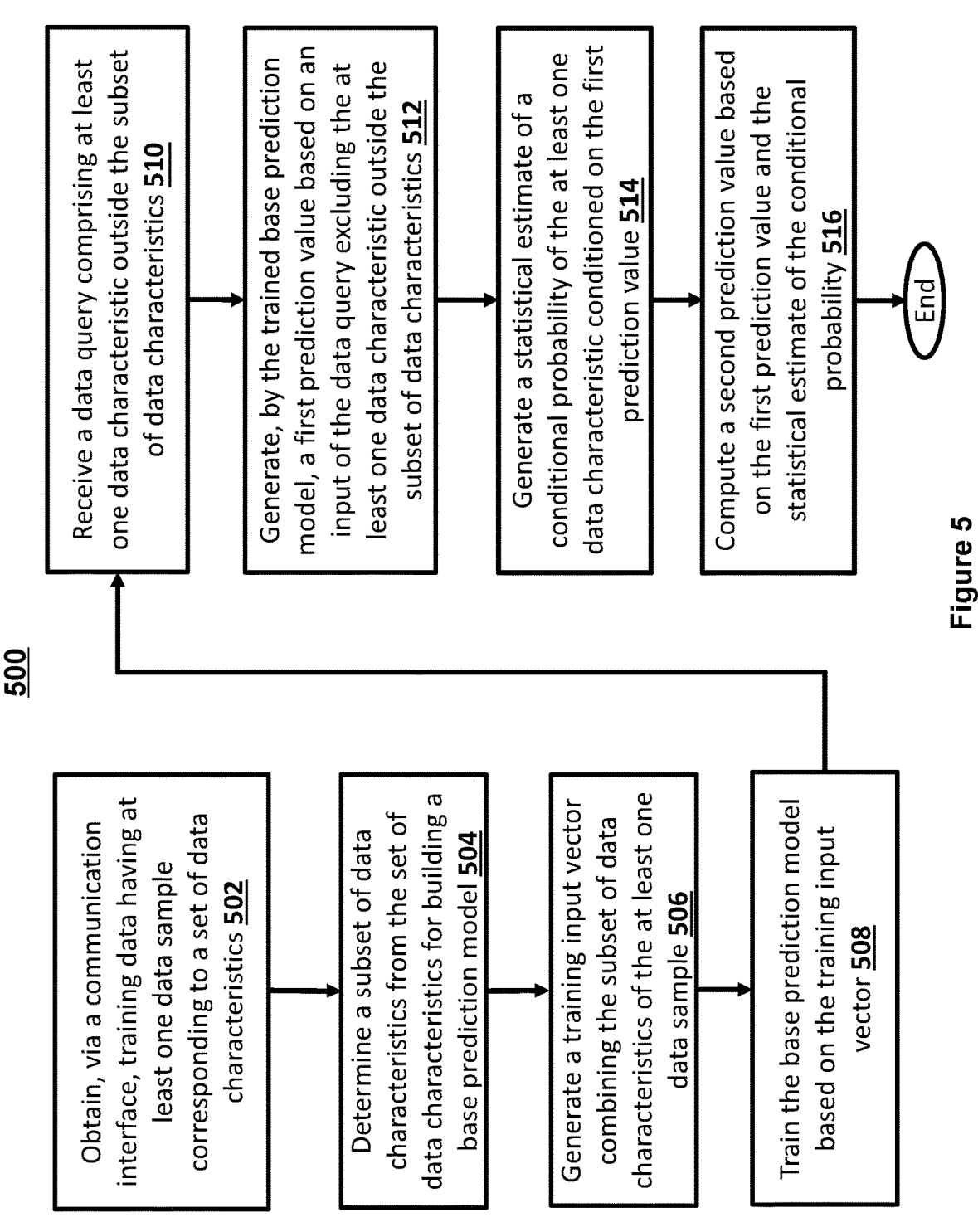
FIG. 5 is a logic flow diagram of an exemplary process for building a prediction model with varying levels of data availability, according to an embodiment described herein.

FIG. 5 is a logic flow diagram of an exemplary process for building a prediction model with varying levels of data availability, according to an embodiment described herein. One or more of the processes 500 may be implemented, at least in part, in the form of executable code stored on non-transitory, tangible, machine-readable media that when run by one or more processors may cause the one or more processors to perform one or more of the processes. In some embodiments, process 500 may be performed by the base prediction model building module 104 and prediction generation module 106 at server 130 in FIGS. 1-2. It is worth noting that additional processes, steps and/or implementations may be omitted, performed in a different sequence, or combined as desired or appropriate.

At step 502, training data (e.g., 102) having at least one data sample (e.g., 304a-n) corresponding to a set of data characteristics (e.g., 301-305) may be obtained via a communication interface (e.g., network interface 133).

At step 504, a subset of data characteristics (e.g., subset 305) are determined from the set of data characteristics for building a base prediction model. For example, the subset of data characteristics for building the base prediction model are determined based on historical availability of the set of data characteristics. Additional details of building the base prediction model may be provided in FIG. 6.

At step 506, a training input vector combining the subset of data characteristics of the at least one data sample may be generated.

At step 508, the base prediction model (e.g., model 115) may be trained based on the training input vector.

At step 510, a data query comprising at least one data characteristic outside the subset of data characteristics may be received, e.g., for testing or model valuation. For example, the at least one characteristic is unavailable at a time of training the base prediction model.

At step 512, the trained base prediction model may generate a first prediction value (e.g., base prediction 415) based on an input of the data query excluding the at least one data characteristic (e.g., additional characteristic 3040 outside the subset of data characteristics (e.g., selected subset 305).

At step 514, a Bayesian estimate of a conditional probability of the at least one data characteristic conditioned on the first prediction value (e.g., base prediction 415) may be generated.

At step 516, a second prediction value (e.g., updated prediction 116) may be computed based on the first prediction value (e.g., base prediction 415) and the statistical estimate of the conditional probability. For example, the second prediction value is computed by a product of the first prediction value and the statistical estimate of the conditional probability divided by a probability of the at least one characteristic.

In one embodiment, when the data query comprises another data characteristics outside the subset of data characteristics, another statistical estimate of another conditional probability of another data characteristic may be generated conditioned on the first prediction value. A third prediction value may be computed based on a product of the second prediction value and another conditional probability.

In one embodiment, the data query may comprise a plurality of data characteristics that are all outside the subset of data characteristics, and the plurality of data characteristics are independent from each other. The trained base prediction model may generate a base prediction value based on an input of the data query only including data characteristics that belong to the subset of data characteristics. For each data characteristic in the plurality of data characteristics, a respective Bayesian estimate of a respective conditional probability of the respective data characteristic is generated conditioned on the base prediction value. An updated prediction value is computed based on a product of Bayesian estimates of conditional probabilities and the base prediction value divided by a marginal probability of the plurality of data characteristics.

Figure 6:
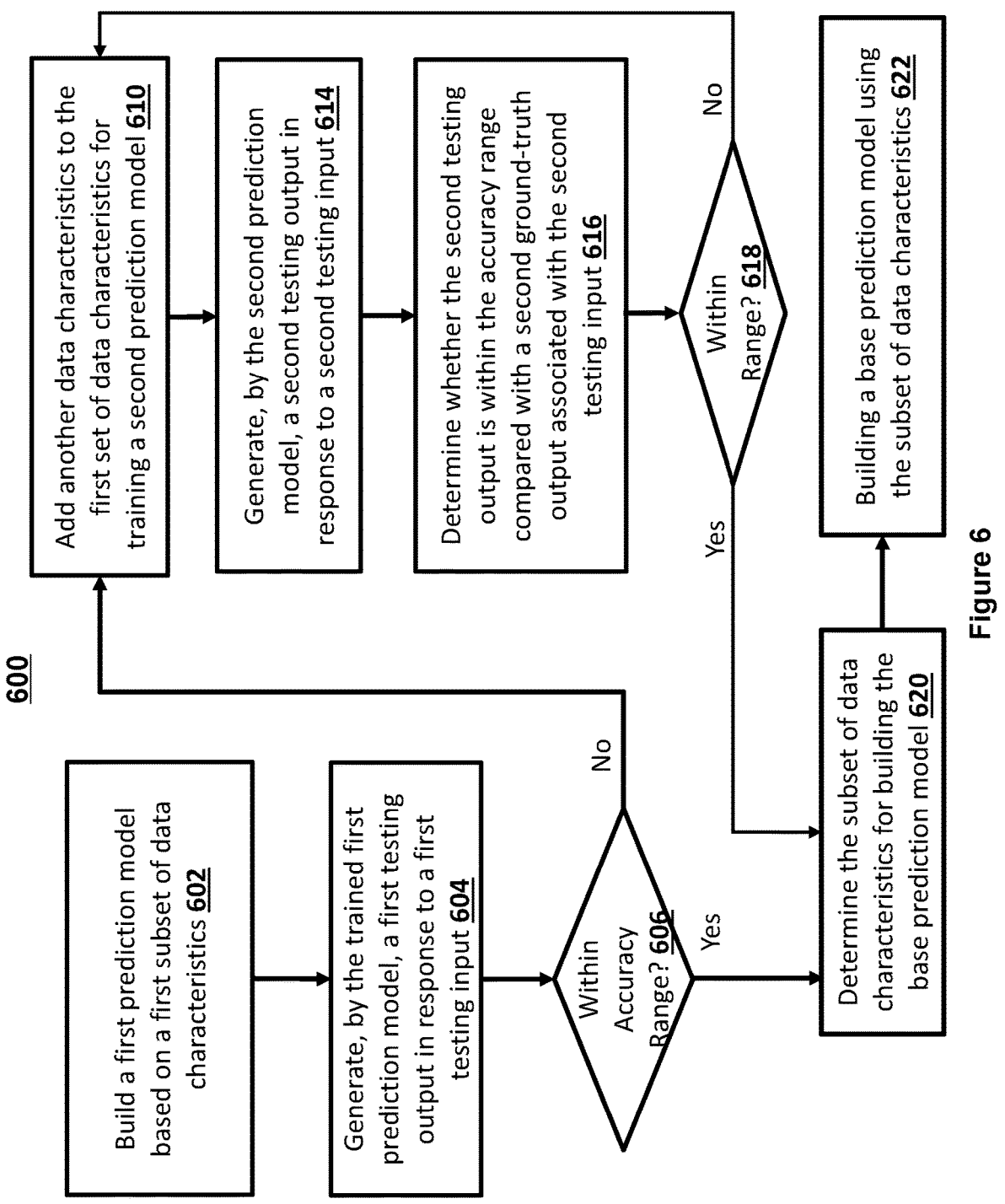
FIG. 6 is a logic flow diagram of an exemplary process for building a base prediction model, according to an embodiment described herein.

FIG. 6 is a logic flow diagram of an exemplary process for building a base prediction model, according to an embodiment described herein. One or more of the processes 600 may be implemented, at least in part, in the form of executable code stored on non-transitory, tangible, machine-readable media that when run by one or more processors may cause the one or more processors to perform one or more of the processes. In some embodiments, process 600 may be performed by the base prediction model building module 104 and prediction generation module 106 at server 130 in FIGS. 1-2. It is worth noting that additional processes, steps and/or implementations may be omitted, performed in a different sequence, or combined as desired or appropriate.

At step 602, a first prediction models may be built based on a first subset of data characteristics, e.g., starting with one characteristic 301, and/or the like.

At step 604, a first testing output may be generated by the trained first prediction model.

At step 606, the first testing output is evaluated, e.g., whether it is within an accuracy range. For example, the first testing output may be compared with a ground-truth value corresponding to the testing input. Or alternatively, the first testing output may be compared with historically generated testing output.

At step 620, if the testing output is within the accuracy range, the subset of data characteristics used at step 602 may be used for building the base prediction model.

Alternatively, if the testing output is not within the accuracy range, another data characteristics is added to the first set of data characteristics for training a second prediction model at step 610.

At step 614, the second prediction model may then generate a second testing output in response to a second testing input.

At step 616, the second testing output is then evaluated again, e.g., by determining whether the second testing output is within the accuracy range compared with a second ground-truth output associated with the second testing input.

At step 618, if the second testing output is not within the accuracy range, process 600 repeats from step 610. If the second testing output is within the accuracy range, process 600 proceeds to step 620, at which the second subset of data characteristics are chosen for base prediction model. In this way, data characteristics may be progressively added to the first set of data characteristics for training a new prediction model until a resulting testing output is within the accuracy range. The resulting first set of data characteristics and the added data characteristics form the subset of data characteristics for building the base prediction model.

At step 622, the base prediction model is then built using the determined subset of data characteristics.

Figure 7:
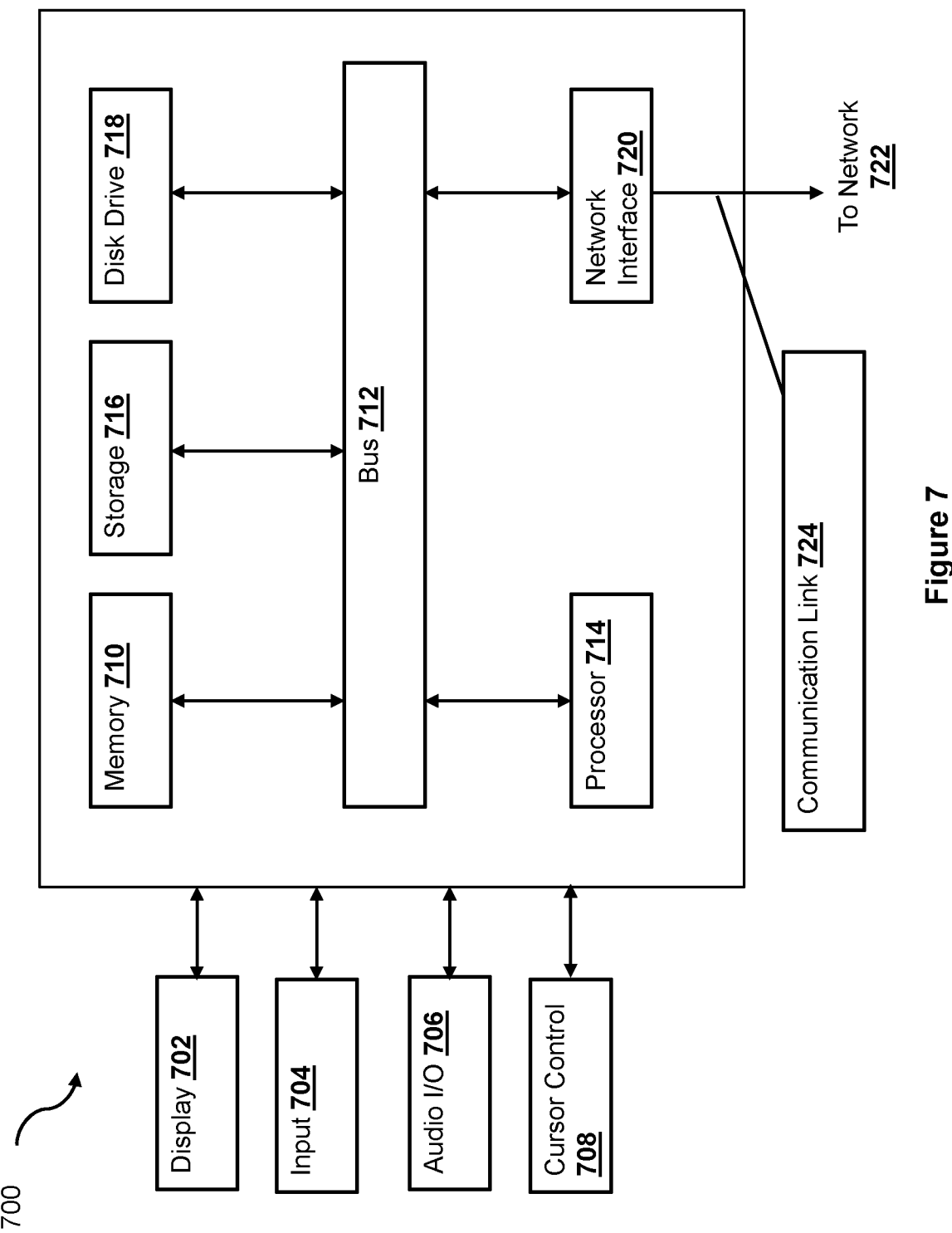
FIG. 7 is a block diagram of a computer system suitable for implementing one or more components shown in FIGS. 1-3 and performing one or more processes shown in FIGS. 5-6, according to an embodiment.

FIG. 7 is a block diagram of a computer system suitable for implementing one or more components shown in FIGS. 1-3 and performing one or more processes shown in FIGS. 5-6, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a trading information page for displaying market data or portfolio data to a user. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for training a machine learning prediction generation model including a base prediction model and a Bayesian estimation layer connected on top of the base prediction model with varying levels of data availability, the method comprising:

obtaining, via a communication interface, training data having a plurality of training data samples, each of the training data samples comprising a set of data characteristics;

determining a subset of data characteristics from the set of data characteristics for building the base prediction model;

training the base prediction model to generate a prediction based on the subset of data characteristics, using the plurality of data samples, each of the training data samples comprising only the subset of data characteristics, wherein the training further comprises:

generating a training input vector combining the subset of data characteristics of the at least one data sample, and updating the base prediction model based on a loss corresponding to a training output that is generated by the base prediction model from the training input vector;

receiving a data query comprising information corresponding to the subset of data characteristics and additional information corresponding to at least one data characteristic outside the subset of data characteristics;

generating, by the trained base prediction model of the machine learning prediction generation model, a first prediction value based on an input of only the information corresponding to the subset of data characteristics comprised in the data query without the additional information corresponding to the at least one data characteristic outside the subset of data characteristics;

generating, by the Bayesian estimation layer of the machine learning prediction generation model, a Bayesian statistical estimate of a conditional probability of the additional information corresponding to the at least one data characteristic conditioned on the first prediction value;

computing a second prediction value based on the first prediction value and the Bayesian statistical estimate of the conditional probability;

implementing the trained machine learning prediction generation model including the trained base prediction model and the Bayesian estimation layer at an autonomous driving vehicle to predict a traffic condition, wherein the trained base prediction model is trained using the training data samples comprising only the subset of data characteristics;

refining, a predicted traffic condition generated by the trained base prediction model, based on the Bayesian statistical estimate of the conditional probability of the at least one data characteristic, when the additional information is available without retraining the base prediction model; and controlling an auto-navigation of the autonomous driving vehicle assisted by the refined predicted traffic condition.

2. The method of claim 1, wherein the at least one characteristic is unavailable at a time of training the base prediction model.

3. The method of claim 1, wherein the second prediction value is computed by a product of the first prediction value and the statistical estimate of the conditional probability divided by a probability of the at least one characteristic.

4. The method of claim 3, wherein the probability of the at least one characteristic is generated from historical data of the at least one characteristic.

5. The method of claim 1, wherein the data query comprises another data characteristic that is also outside the subset of data characteristics, and the method comprises:

generating another statistical estimate of another conditional probability of the another data characteristic conditioned on the first prediction value; and computing a third prediction value based on a product of the second prediction value and the another conditional probability.

6. The method of claim 1, wherein the data query comprises a plurality of data characteristics that are all outside the subset of data characteristics, and the plurality of data characteristics are independent from each other, and the method comprises:

generating, by the trained base prediction model, a base prediction value based on an input of the data query only including data characteristics that belong to the subset of data characteristics;

generating, for each data characteristic in the plurality of data characteristics, a respective statistical estimate of a respective conditional probability of the respective data characteristic conditioned on the base prediction value; and computing an updated prediction value based on a product of statistical estimates of conditional probabilities and the base prediction value divided by a marginal probability of the plurality of data characteristics.

7. The method of claim 1, wherein the training data contains no data sample having the at least one data characteristic at a time when the base prediction model is trained.

8. The method of claim 1, wherein the data query comprises a plurality of data characteristics that are all outside the subset of data characteristics, and a first data characteristic and a second data characteristic from the plurality are correlated, and the method comprises:

generating, by the trained base prediction model, a base prediction value based on an input of the data query only including data characteristics that belong to the subset of data characteristics;

generating, for the first data characteristic and the second data characteristic, a statistical estimate of a joint conditional probability of the first data characteristic and the second data characteristic conditioned on the base prediction value;

generating, for other data characteristics in the plurality of data characteristics, a respective statistical estimate of a respective conditional probability of the respective data characteristic conditioned on the base prediction value; and computing an updated prediction value based on a product of statistical estimates of conditional probabilities of independent data characteristics, the statistical estimate of the joint conditional probability and the base prediction value, divided by a marginal probability of the plurality of data characteristics.

9. The method of claim 1, wherein the subset of data characteristics for building the base prediction model are determined based on historical availability of the set of data characteristics.

10. The method of claim 1, wherein the subset of input characteristics for building the base prediction model are determined by:

building multiple prediction models based on different training datasets corresponding to different sets of data characteristics;

generating testing outputs from the multiple prediction models in response to a same testing input query; and identifying relevant data characteristics for building the base prediction model depending on whether the testing outputs are within an accuracy range.

11. The method of claim 10, further comprising:

training a first prediction model based on a first input comprising a first set of data characteristics;

generating, by the trained first prediction model, a first testing output in response to a first testing input;

determining whether the first testing output is within an accuracy range compared with a first ground-truth output associated with the first testing input.

12. The method of claim 11, further comprising:

in response to determining that the first testing output is outside the accuracy range:

adding another data characteristics to the first set of data characteristics for training a second prediction model;

generating, by the second prediction model, a second testing output in response to a second testing input; and determining whether the second testing output is within the accuracy range compared with a second ground-truth output associated with the second testing input.

13. The method of claim 12, further comprising:

progressively adding data characteristics to the first set of data characteristics for training a new prediction model until a resulting testing output is within the accuracy range; and determining that the first set of data characteristics and the added data characteristics form the subset of data characteristics for building the base prediction model.

14. A system training a machine learning model including a base prediction model and a Bayesian estimation layer connected on top of the base prediction model with varying levels of data availability, the system comprising:

a communication interface that obtaining training data having a plurality of training data samples, each of the training data samples comprising a set of data characteristics;

a memory storing a plurality of processor-executable instructions; and a processor executing the instructions to perform operations comprising:

determining a subset of data characteristics from the set of data characteristics for building the base prediction model;

training the base prediction model using the plurality of data samples to generate a prediction based on the subset of data characteristics, each of the training data samples comprising only the subset of data characteristics, wherein the training further comprises:

generating a training input vector combining the subset of data characteristics of the at least one data sample, and updating the base prediction model based on a loss corresponding to a training output that is generated by the base prediction model from the training input vector;

receiving a data query comprising information corresponding to the subset of data characteristics and additional information corresponding to at least one data characteristic outside the subset of data characteristics;

generating, by the trained base prediction model, a first prediction value based on an input of only the information corresponding to the subset of data characteristics comprised in the data query without the additional information corresponding to the at least one data characteristic outside the subset of data characteristics;

generating, by the Bayesian estimation layer of the machine learning prediction generation model, a Bayesian statistical estimate of a conditional probability of the additional information corresponding to the at least one data characteristic conditioned on the first prediction value;

computing a second prediction value based on the first prediction value and the Bayesian statistical estimate of the conditional probability;

implementing the trained machine learning prediction generation model including the trained base prediction model and the Bayesian estimation layer at an autonomous driving vehicle to predict a traffic condition, wherein the trained base prediction model is trained using the training data samples comprising only the subset of data characteristics;

refining, a predicted traffic condition generated by the trained base prediction model, based on the Bayesian statistical estimate of the conditional probability of the at least one data characteristic, when the additional information is available without retraining the base prediction model; and controlling an auto-navigation of the autonomous driving vehicle assisted by the refined predicted traffic condition.

15. The system of claim 14, wherein the data query comprises a plurality of data characteristics that are all outside the subset of data characteristics, and the plurality of data characteristics are independent from each other, and the operations comprise:

generating, by the trained base prediction model, a base prediction value based on an input of the data query only including data characteristics that belong to the subset of data characteristics;

generating, for each data characteristic in the plurality of data characteristics, a respective statistical estimate of a respective conditional probability of the respective data characteristic conditioned on the base prediction value; and computing an updated prediction value based on a product of statistical estimates of conditional probabilities and the base prediction value divided by a marginal probability of the plurality of data characteristics.

16. The system of claim 14, wherein the data query comprises a plurality of data characteristics that are all outside the subset of data characteristics, and a first data characteristic and a second data characteristic from the plurality are correlated, and the operations comprise:

generating, by the trained base prediction model, a base prediction value based on an input of the data query only including data characteristics that belong to the subset of data characteristics;

generating, for the first data characteristic and the second data characteristic, a statistical estimate of a joint conditional probability of the first data characteristic and the second data characteristic conditioned on the base prediction value;

generating, for other data characteristics in the plurality of data characteristics, a respective statistical estimate of a respective conditional probability of the respective data characteristic conditioned on the base prediction value; and computing an updated prediction value based on a product of statistical estimates of conditional probabilities of independent data characteristics, the statistical estimate of the joint conditional probability and the base prediction value, divided by a marginal probability of the plurality of data characteristics.

17. The system of claim 14, wherein the subset of input characteristics for building the base prediction model are determined by:

building multiple prediction models based on different training datasets corresponding to different sets of data characteristics;

generating testing outputs from the multiple prediction models in response to a same testing input query; and identifying relevant data characteristics for building the base prediction model depending on whether the testing outputs are within an accuracy range.

18. The system of claim 14, wherein the subset of input characteristics for building the base prediction model are determined by:

training a first prediction model based on a first input comprising a first set of data characteristics;

generating, by the trained first prediction model, a first testing output in response to a first testing input;

determining whether the first testing output is within an accuracy range compared with a first ground-truth output associated with the first testing input;

in response to determining that the first testing output is outside the accuracy range:

adding another data characteristics to the first set of data characteristics for training a second prediction model;

generating, by the second prediction model, a second testing output in response to a second testing input; and determining whether the second testing output is within the accuracy range compared with a second ground-truth output associated with the second testing input;

progressively adding data characteristics to the first set of data characteristics for training a new prediction model until a resulting testing output is within the accuracy range; and determining that the first set of data characteristics and the added data characteristics form the subset of data characteristics for building the base prediction model.

19. A non-transitory processor-readable storage medium storing a plurality of processor-executable instructions for training a machine learning prediction generation model including a base prediction model and a Bayesian estimation layer connected on top of the base prediction model with varying levels of data availability, the instructions being executed by a processor to perform operations comprising:

obtaining, via a communication interface, training data having a plurality of training data samples, each of the training data samples comprising a set of data characteristics;

determining a subset of data characteristics from the set of data characteristics for building the base prediction model;

training the base prediction model using the plurality of data samples to generate a prediction based on the subset of data characteristics, each of the training data samples comprising only the subset of data characteristics, wherein the training further comprises:

generating a training input vector combining the subset of data characteristics of the at least one data sample, and updating the base prediction model based on a loss corresponding to a training output that is generated by the base prediction model from the training input vector;

receiving a data query comprising information corresponding to the subset of data characteristics and additional information corresponding to at least one data characteristic outside the subset of data characteristics;

generating, by the trained base prediction model, a first prediction value based on an input of only the information corresponding to the subset of data characteristics comprised in the data query without the additional information corresponding to the at least one data characteristic outside the subset of data characteristics;

generating, by the Bayesian estimation layer of the machine learning prediction generation model, a Bayesian statistical estimate of a conditional probability of the additional information corresponding to the at least one data characteristic conditioned on the first prediction value;

computing a second prediction value based on the first prediction value and the Bayesian statistical estimate of the conditional probability;

implementing the trained machine learning prediction generation model including the trained base prediction model and the Bayesian estimation layer at an autonomous driving vehicle to predict a traffic condition, wherein the trained base prediction model is trained using the training data samples comprising only the subset of data characteristics;

refining, a predicted traffic condition generated by the trained base prediction model, based on the Bayesian statistical estimate of the conditional probability of the at least one data characteristic, when the additional information is available without retraining the base prediction model; and controlling an auto-navigation of the autonomous driving vehicle assisted by the refined predicted traffic condition.

* * * * *